United States Patent [19]
Sullivan et al.

[11] Patent Number: 6,099,416
[45] Date of Patent: *Aug. 8, 2000

[54] METHOD OF IMPROVING SCUFF AND CUT RESISTANCE OF COVER FOR GAME BALL

[75] Inventors: Michael J. Sullivan, Chicopee; R. Dennis Nesbitt, Westfield, both of Mass.

[73] Assignee: Spalding Sports Worlwide, Inc.

[ * ] Notice: This patent is subject to a terminal disclaimer.

[21] Appl. No.: 09/236,848

[22] Filed: Jan. 25, 1999

Related U.S. Application Data

[63] Continuation-in-part of application No. 08/942,653, Oct. 2, 1997, Pat. No. 5,891,973, which is a continuation of application No. 08/595,898, Feb. 6, 1996, abandoned.

[51] Int. Cl.[7] .............................. A63B 37/12; A63B 37/14
[52] U.S. Cl. .............................................................. 473/378
[58] Field of Search ........................ 473/378; 273/235 R, 273/235 A, 235 B, 213

[56] References Cited

U.S. PATENT DOCUMENTS

| | | | |
|---|---|---|---|
| 2,805,072 | 9/1957 | Smith | 273/235 |
| 2,933,441 | 4/1960 | Mallon | 204/154 |
| 3,572,721 | 3/1971 | Harrison et al. | 372/218 |
| 3,616,101 | 10/1971 | Satchell et al. | 161/7 |
| 3,992,241 | 11/1976 | Ferrari | 156/272 |
| 4,056,421 | 11/1977 | Jarvis | 156/272 |
| 4,185,831 | 1/1980 | Tominaga | 273/235 R |
| 4,419,469 | 12/1983 | Böhm et al. | 524/68 |
| 4,871,589 | 10/1989 | Kitaoh et al. | 427/322 |
| 4,884,814 | 12/1989 | Sullivan | 273/235 R |
| 5,000,459 | 3/1991 | Isaac | 273/235 R |
| 5,120,791 | 6/1992 | Sullivan | 525/196 |
| 5,234,516 | 8/1993 | Okamura et al. | 156/82 |
| 5,286,532 | 2/1994 | Yoshikawa et al. | 427/536 |
| 5,378,531 | 1/1995 | Larson et al. | 428/255 |
| 5,397,840 | 3/1995 | Sullivan et al. | 525/221 |
| 5,516,847 | 5/1996 | Sullivan et al. | 525/221 |
| 5,540,876 | 7/1996 | Larson et al. | 264/479 |
| 5,542,677 | 8/1996 | Sullivan et al. | 473/385 |
| 5,624,332 | 4/1997 | Dalton et al. | 473/354 |
| 5,891,973 | 4/1999 | Sullivan et al. | 473/378 X |

FOREIGN PATENT DOCUMENTS

| | | |
|---|---|---|
| 650959 | 10/1962 | Canada . |
| 911147 | 11/1962 | United Kingdom . |

*Primary Examiner*—Benjamin H. Layno

[57] ABSTRACT

Disclosed herein is a golf ball having a non-ionomeric cover and method for making the same. The golf ball has been treated with crosslink-inducing irradiation at levels of at least 2 megarads up to 15 megarads. The non-ionomeric resin cover is made from material selected from the group consisting of non-ionomeric acid copolymers and terpolymers, polyamides, styrene block copolymers, polyamide block copolymers and syndiotactic resins. The golf ball cover is relatively soft, having a Shore D hardness that is no more than 10% greater than a cover having an identical composition but not radiation crosslinked. The cover is superior in cut resistance and scuff resistance to a conventional cover of substantially identical composition that is not covalently crosslinked. The golf ball cover of the invention is particularly useful for improving the durability of golf balls to be struck with sharp-grooved clubs.

15 Claims, 1 Drawing Sheet

METHOD OF IMPROVING SCUFF AND CUT RESISTANCE OF COVER FOR GAME BALL

RELATED APPLICATIONS

This application is a continuation-in-part of U.S. application Ser. No. 08/942,653 filed Oct. 2, 1997, now U.S. Pat. No. 5,891,973 which is a continuation of U.S. application Ser. No. 08/595,898 filed Feb. 6, 1996, now abandoned.

BACKGROUND OF THE INVENTION

This invention relates generally to game balls, and more particularly to a game ball, such as a golf ball, having a cover formed predominantly from a non-ionomer polymeric material.

Before the development of ionomers, balata was the preferred material for golf ball covers. Polyethylene also was proposed for use as a golf ball cover material but was generally deemed highly inferior to balata in imparting playability and durability characteristics to the ball due to its brittleness and high hardness, and thus never became a commercially successful golf ball cover material.

Balata golf ball covers have now been replaced to a great extent by ionomeric cover materials. Ionomers are copolymers of an olefin and an $\alpha,\beta$-ethylenically unsaturated carboxylic acid with a portion of the carboxylic acid groups neutralized by a metal ion. The metal ions serve as crosslinking agents, as they are ionically bonded to carboxylic acid groups in adjacent copolymer chains. Instead of having thermally irreversible covalent bonding, ionomers have thermolabile crosslinking bonds in which metal ions become part of the chemical structure of the ionomer upon crosslinking, and these crosslinks are reversible. For purposes of this application, this type of crosslinking is referred to as ionic crosslinking. One of the advantages of ionic crosslinking in golf ball materials is the ability of ionic bonds to re-form after breaking as a result of processing at elevated temperatures.

There are numerous advantages to the use of ionomers in making golf ball covers. On the other hand, one drawback of conventional golf balls with soft ionomeric covers are that the covers are prone to scuffing and cutting, particularly when hit with irons which have sharp grooves. It would be useful to develop a golf ball with a soft cover which is highly resistant to cutting and scuffing by sharp-grooved clubs.

SUMMARY OF THE INVENTION

An object of the invention is to provide a non-ionomeric game ball cover having improved scuff resistance and/or cut resistance.

Another object of the invention is to provide a method for imparting improved scuff resistance and/or cut resistance to a game ball cover.

Yet another object of the invention is to provide a golf ball with a soft cover which is well-suited for use with golf club irons having sharp grooves.

Yet another object of the invention is to provide a method of forming a golf ball with a soft cover which has excellent scuff resistance and/or cut resistance.

Other objects will be in part obvious and in part pointed out more in detail hereinafter.

The invention in a preferred form is a game ball having a cover comprised predominantly of a non-ionomer resin. The resin advantageously has a sufficient degree of covalent crosslinking to impart to the cover improved resistance to at least one of scuffing and cutting. In a particularly preferred form of the invention, the game ball is a golf ball. Preferably, the game ball has a dimpled surface. The covalent crosslinking preferably comprises irradiation-induced covalent crosslinking.

In a preferred form of the invention, the degree of covalent crosslinking is appropriate to impart to the cover a Shore D hardness which is no more than about 10% greater, and more preferably no more than about 5% greater, than the Shore D hardness of a cover having an identical composition but which does not include a substantial degree of radiation-induced covalent crosslinking.

Another preferred form of the invention is a method of treating a game ball. The method comprises the steps of obtaining a game ball having a cover comprised predominantly of a non-ionomer polymeric resin, and irradiating the resin in the cover under conditions appropriate to covalently crosslink the cover material in order to increase the resistance of the cover to at least one of scuffing and cutting without substantially impairing other playability or physical characteristics of the ball. In a particularly preferred form of the invention, the game ball is a golf ball. Preferably, the game ball has a dimpled surface.

According to the preferred method of the invention, the game ball cover is subjected to gamma radiation treatment at a dosage of at least 2 megarads. The game ball cover preferably is irradiated prior to application of a top coat over the cover. The method of the invention preferably further includes the step of applying a top coat over the cover before or after irradiation.

The invention accordingly comprises the several steps and the relation of one or more of such steps with respect to each of the others and the article possessing the features, properties, and the relation of elements exemplified in the following detailed disclosure.

DETAILED DESCRIPTION OF THE INVENTION

The game balls of the present invention are surprisingly superior in their scuff (abrasion) resistance and cut resistance to conventional game balls which have not been irradiation-treated, and which contain similar quantities of non-ionomeric compositions, such as polyurethanes, with similar properties of compression, coefficient of restitution (COR) and hardness.

The game balls of the invention are formed by first obtaining an uncoated or coated game ball. An "uncoated" game ball as the term is used in this application is a one, two, or multi-piece game ball to which no primer or top coat has been applied over the cover. In contrast, a "coated" game ball as this term is used in this application is a ball which has a primer coat and/or a top coat over the cover layer. The coated or uncoated game ball of the invention is subjected to irradiation under conditions appropriate to induce covalent crosslinking of the polymeric cover material. This type of direct covalent bonding has been found to take place in cover materials when gamma radiation treatment is applied at a dosage of 2 or more megarads and is expected to also be useful at lower dosages, for example, 1 megarad.

For clarity of description and ease of understanding, the invention will be described in connection with golf balls although it will be understood that other game balls, including but not limited to softballs, basketballs, baseballs, soccer balls, volleyballs, street hockey balls, footballs, and the like, can advantageously employ the features of the present invention.

Figure 1:
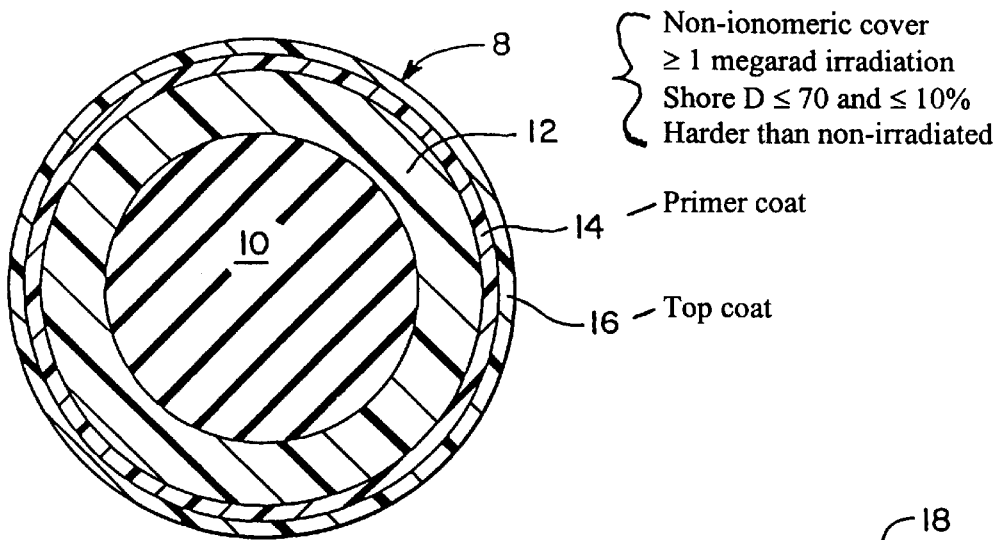
FIG. 1 shows a golf ball according to the present invention.

Referring now to the drawings, and in particular to FIG. 1, a golf ball according to the present invention is shown and is designated as 8. The ball has a core 10, which is solid, or is formed from any other suitable type of core composition such as a wound core. A cover 12 surrounds the core 10. A thin primer coat 14 is applied to the outer surface of cover 12. A thin top coat 16 surrounds the primer coat 14.

The thicknesses of primer coat 14 and top coat 16 are exaggerated for illustrative purposes.

In accordance with the present invention, after the cover layer 12 is applied over the core, the cover layer 12 is subjected to irradiation at a dose of about 1 or more megarads in order to covalently crosslink the cover material. Particularly good results are obtained when the dosage is 2–15 megarads. In a most preferred form of the invention, a dosage of 3–12 megarads is utilized. As used herein, the term "irradiation" refers to short-duration irradiation using gamma rays, an electron beam or the like, rather than to mere exposure to sunlight, which would result in a dosage of well below 1 megarad. Irradiation takes place at a temperature below the melting or deformation temperature of the cover layer, and for convenience preferably takes place at ambient temperature.

The cover 12 can be irradiated prior to or after application of primer coat 14 and top coat 16. Furthermore, primer coat 14 can be eliminated if adhesion of top coat 16 to cover 12 is sufficient to render the ball suitable for competitive play, as is commonly the case with softballs and baseballs, and may also be the case for other game balls.

The game ball of the invention can be irradiated with electrons, neutrons, protons, gamma rays, x-rays, helium nuclei, or the like. In a particularly preferred form of the invention, the scuff and cut resistance of cover 12 is enhanced by subjecting the cover to gamma rays or electron beam treatment at a dosage sufficient to significantly improve scuff resistance and COR without excessively hardening the compression or adversely impacting the properties of the core. The game ball preferably obtains an improvement in COR of at least 0.5% as a result of irradiation of the cover.

The cover composition preferably contains high quantities of non-ionomer resins. However, the irradiated cover material may have a combination of ionic crosslinks and covalent crosslinks. The polymers typically, although not necessarily, have a Shore D hardness in the range of 20–70. It will be appreciated that non-ionomeric materials can be blended with ionomer as long as an acceptable increase in scuff resistance and/or cut resistance is obtained as a result of covalent crosslinking of the blend. Non-limiting examples of the non-ionomeric materials include ethylene-ethyl acrylate, ethylene-methyl acrylate, ethylene-vinyl acetate, low density polyethylene, linear low density polyethylene, metallocene catalyzed polyolefins such as ENGAGE polyolefins available from Dow Chemical and EXACT polyolefins available from Exxon, (maleated metallocenes which have improved compatibility with the ionomeric material are preferred), polyamides including nylon copolymers such as Nylon 6 and Nylon 66, as well as nylon-ionomer graft copolymers such as CAPRON 8351 available from Allied Signal, non-ionomeric acid copolymers such as PRIMACOR, available from Dow Chemical, and NUCREL, available from DuPont, and a variety of thermoplastic elastomers, including styrene-butadiene-styrene block copolymers such as KRATON available from Shell, SANTOPRENE available from Monsanto, thermoplastic block polyamides such as PEBAX and similar polyester amides, polyurethanes, polyureas, thermoplastic block polyesters, such as HYTREL available from DuPont, functionalized (e.g., maleic anhydride modified) EPR and EPDM, and syndiotactic butadiene resin. Other elastomers capable of being crosslinked by irradiation include materials such as acrylic, chlorinated polyethylene, chlorosulfonated polyethylene, epichlorohydrin, ethylene/acrylic, ethylene-octene, ethylene-propylene copolymers, isoprene-acrylonitrile, nitrile, cis 1,4 polybutadiene, polychloroprene, polyisoprene, natural rubber, silicone, styrene-butadiene and urethane.

In order to obtain the desired Shore D hardness, it may be necessary to add one or more crosslinking monomers and/or reinforcing agents to the polymer composition. Nonlimiting examples of crosslinking monomers which can be used according to the invention are zinc diacrylate, zinc dimethacrylate, ethylene dimethacrylate (e.g., SR-297, Sartomer Company), trimethylol propane triacrylate. If crosslinking monomers are used, they typically are added in an amount of 3–40 parts by weight based upon 100 parts by weight of polymer, and more preferably 5–30 parts by weight. A nonlimiting example of a suitable reinforcing agent is fine particle silica, such as HiSil 233 from PPG, Pittsburgh, Pa. Reinforcing agents typically are used in an amount of 3–60 parts by weight based upon 100 parts by weight of polymer, and more preferably 5–50 parts by weight. Coupling agents such as A-172 from Union Carbide of Danbury, Conn. can be used at a level of about 1% to increase the physical properties of the compound.

If the game ball cover is irradiated prior to application of a primer coat 14 and/or top coat 16, there is no particular restriction on the type of primer coat and/or top coat to be used. If irradiation occurs after application of a primer coat and/or a top coat over the cover 12, it is important to ensure that the radiation will penetrate the coating and that the dosage of radiation is sufficient to covalently crosslink the cover material without adversely affecting the properties of the primer and/or top coat to a substantial degree. Due to the thinness of the primer coat and top coat on most game balls, including golf balls, it has been found that little change in radiation dosage is required if irradiation occurs after application of such coatings.

Golf balls according to the invention preferably have a post-irradiation PGA compression of 10–110. In a particularly preferred form of the invention, the golf balls have a PGA compression of about 40–100 after irradiation. It has been found that excellent results are obtained when the post-irradiation PGA compression of the golf balls is 60–100. The irradiation method of the invention preferably results in an increase in PGA compression of at least 5% as compared to the PGA compression of the ball prior to treatment. The coefficient of restitution of the golf balls of the invention after treatment is at least about 0.780 or greater. Preferably, the COR of the golf balls is in the range of 0.790–0.830 and most preferably 0.800–0.830. The Shore D hardness of the golf balls of the invention after irradiation is in the range of 25–80. Particularly good results are obtained when the Shore D hardness of the golf balls is in the range of 30–70, and most preferably 35–60.

The invention is particularly well suited for use in making dimpled, pebbled, and other game balls which do not have a smooth outer surface, including game balls with simulated stitching. A smooth ball is less susceptible to scuffing than a dimpled ball since dimples give the golf club groove a sharp-edged surface to "catch." Pebbles clearly are susceptible to shearing when dribbled on a hard surface, or the like. Likewise on a molded-cover softball, the stitching is a raised area that will be sheared or compressed more than the smooth-surfaced area by a bat and/or by the turf, dirt, etc.

Figure 2:
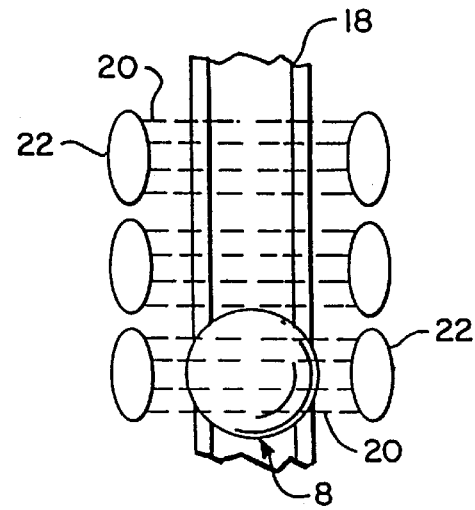
FIGS. 2–3 schematically show one embodiment for practicing the method of the invention.
Figure 3:
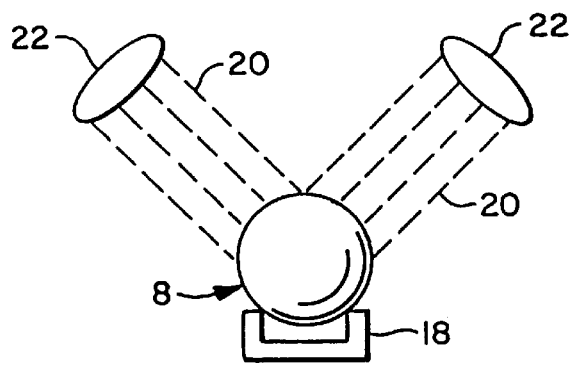

One embodiment of a method for radiation treating golf balls according to the invention can be described in connection with FIGS. 2 and 3. The golf ball 8 is placed on a channel 18 along which it slowly moves. Radiation 20 from a source 22 contact the surface of the ball 8. The source is positioned to provide a generally uniform dose of radiation on the entire surface of the ball as the ball rolls along the channel 18. The balls are irradiated with a dosage of 1 or more megarads, more preferably 2–15 megarads. The intensity of the dosage preferably is in the range of 1–20 MeV.

The golf balls of the invention are found to exhibit a post-treatment scuff resistance in the range of 1–3 on a scale of 1–4. It is preferred that the treatment be appropriate to provide the golf balls with a scuff resistance of 1–2.5, and more preferably 1–2. Golf balls according to the invention have a cut resistance in the range of 1–3 on a scale of 1–5. It is preferred that the golf balls of the invention have a cut resistance of 1–2.5 and most preferably 1–2.

The scuff resistance test was conducted in the following manner: a Top-Flite Tour pitching wedge (1994) with box grooves was obtained and was mounted in a Miyamae driving machine. The club face was oriented for a square hit. The forward/backward tee position was adjusted so that the tee was four inches behind the point in the downswing where the club was vertical. The height of the tee and the toe-heel position of the club relative to the tee were adjusted in order that the center of the impact mark was about ¾ of an inch above the sole and was centered toe to heel across the face. The machine was operated at a clubhead speed of 125 feet per second. Three samples of each ball were tested. Each ball was hit three times. After testing, the balls were rated according to the following table:

| Rating | Type of damage |
| --- | --- |
| 1 | Little or no damage (groove markings or dents) |
| 2 | Small cuts and/or ripples in cover |
| 3 | Moderate amount of material lifted from ball surface but still attached to ball |
| 4 | Material removed or barely attached |

Cut resistance was measured in accordance with the following procedure: A golf ball was firmly held in a cavity to expose the top half of the ball. A guillotine style blade weighing five pounds and having inner and outer blade edge angles of 90° and 60° respectively and a cutting edge of three sixty-fourths inch radius is dropped from a height of 3.5 feet to strike the ball at a point one-half inch off the top center point. The guillotine blade is guided during the drop by means of a substantially friction-free vertical track.

The cut resistance of the balls tested was evaluated on a scale of 1–5.

| Rating | Type of Damage |
| --- | --- |
| 5 | A cut that extends completely through the cover to the core |
| 4 | A cut that does not extend completely through but that does break the surface |
| 3 | Does not break the surface but does leave a permanent dent |
| 2 | Leaves a slight crease which is permanent but not as severe as 3 |
| 1 | Virtually no visible indentation or damage of any sort |

It has been found that golf balls which are treated according to the irradiation technique of the present invention exhibit a particular improvement in scuff and/or cut resistance. This improvement is particularly significant when the golf balls are struck with a square-grooved iron. It is has been found that square-grooved irons and other sharp-grooved irons tend to abrade and damage golf ball covers more readily than irons having "V-type" grooves.

Having generally described the invention, the following examples are included for purposes of illustration so that the invention may be more readily understood and are in no way intended to limit the scope of the invention unless otherwise specifically indicated.

EXAMPLE 1

A cover material was prepared having the following formulation in parts by weight:

| Component | Amount |
|---|---|
| High styrene content SBR | 100 |
| Precipitated silica | 20 |
| Titanium dioxide | 2 |
| Trimethylol propane trimethacrylate | 5 |
| Silane A-172 coupling agent | 0.3 |

The high styrene content SBR is a blend of 60% styrene-butadiene and 40% of a high styrene resin.

The material was milled, formed into a sheet and tested for hardness before and after gamma radiation at different dosage levels. The resultant hardness values are set forth in Table 1.

The material was milled, formed into a sheet having a thickness of 0.130 inch and cut into squares having a size of 2"×2". Half shells were compression molded using a single female smooth cavity of 1.680" diameter and a 1.624" male smooth cavity. Two resultant half shells were placed around a 1.545" "Z Balata" solid core and placed in a dimpled cavity mold for final molding. The resultant balls were tested for scuff and cut resistance using the procedures outlined herein with no irradiation and following six magarads of irradiation. The results are set forth in Table 2.

EXAMPLE 2

The procedure of Example 1 was repeated except that the high styrene resin was replaced with a syndiotactic resin. The resultant hardness values are reported in Table 1, while the scuff and cut resistance can be found in Table 2.

EXAMPLE 3

The procedure of Example 1 was repeated except that the formulation was changed to the following:

| Component | Amount |
|---|---|
| Ethylene propylene dimethacrylate | 100 |
| Precipitated silica | 35 |
| Titanium dioxide | 2 |
| Trimethylol propane trimethacrylate | 10 |
| Silane-A-172 | 0.3 |

The resultant hardness results are reported in Table 1 and the scuff and cut resistance ratings are in Table 2.

TABLE 1

| Cover Material | Dosage (Megarads | Shore D |
|---|---|---|
| Example 1 | 3.5 | 50 |
|  | 7.0 | 50 |
|  | 12.0 | 52 |
|  | 0 | 28 |
| Example 2 | 3.5 | 25 |
|  | 7.0 | 28 |
|  | 12.0 | 30 |
|  | 0 | 8 |
| Example 3 | 3.5 | 33 |
|  | 7.0 | 35 |
|  | 12.0 | 37 |
|  | 0 | 13 |

As indicated in Table 2, the scuff and cut resistance of the balls increased substantially as a result of the irradiation treatment.

TABLE 2

| Cover Material | Irradiation | Scuff | Cut |
|---|---|---|---|
| Example 1 | No | 4 | 4 |
|  | Yes | 2 | 3 |
| Example 2 | No | 3 | 5 |
|  | Yes | 2 | 2 |
| Example 3 | No | 2 | 4 |
|  | Yes | 1 | 1 |
| Commercial ionomer cover control |  | 3 | 2 |

As will be apparent to persons skilled in the art, various modifications and adaptations of the structure above described will become readily apparent without departure from the spirit and scope of the invention, the scope of which is defined in the appended claims.

What is claimed is:

1. A golf ball having a cover comprised predominantly of a non-ionomer resin having a sufficient degree of covalent crosslinking to impart to the cover improved resistance to at least one of scuffing and cutting, the resin being selected for the group consisting of non-ionomeric acid co-polymers and terpolymers, polyamides, styrene block copolymers, polyamide block copolymers and syndiotactic resins, the extend of covalent crosslinking of the resin being that which results from a radiation dosage of at least 1 megarad the radiation dosage providing an increase in Shore D hardness of no more than 10% relative to the hardness of the identical composition that is not irradiated, the post radiation treatment scuff and cut resistance being in the range of about 1–2.

2. A golf ball according to claim 1, wherein the degree of covalent crosslinking is sufficient to impart to the ball a PGA compression which is at least 5% harder than the PGA compression of a golf ball with a cover having a substantially identical composition but which does not have a substantial degree of covalent crosslinking.

3. A golf ball according to claim 1, wherein the cover has a dimpled surface.

4. A golf ball according to claim 1, wherein the covalent crosslinking comprises radiation-induced covalent crosslinking.

5. A golf ball according to claim 4, wherein the degree of covalent crosslinking is sufficient to impart to the ball a coefficient of restitution which is at least 0.50% greater than a coefficient of restitution of a ball with a cover having a substantially identical composition but which does not have radiation-induced covalent crosslinking.

6. A game ball according to claim 1, wherein the cover has a Shore D hardness of about 70 or less.

7. A golf ball according to claim 1, wherein the non-ionomeric material is a polyamide.

8. A golf ball according to claim 1, wherein the non-ionomeric material is a block copolymer.

9. A golf ball according to claim 1, wherein the non-ionomeric material is a non-ionomeric acid co-polymer.

10. A golf ball having a cover comprised predominantly of a non-ionomer resin, having a degree of radiation-induced covalent crosslinking which is sufficient to substantially improve the resistance of the cover to at least one of scuffing and cutting while resulting in a cover hardness (Shore D) which is no more than about 5.0% higher than the Shore D hardness of a cover which is substantially identical in composition but does not contain covalent crosslinking.

11. A method of forming a golf ball comprising:

obtaining a golf ball having a cover comprised predominantly of a non-ionomer resin selected from the group consisting of non-ionomeric acid co-polymers and terpolymers, poly-amides, styrene block copolymers, polyamide block copolymers and syndiotactic resins and irradiating the non-ionomeric resin in the cover under conditions appropriate to covalently crosslink the non-ionomer resin in order to increase the resistance of the cover to at least one of scuffing and cutting without increasing the Shore D hardness by more than 10% and without substantially impairing other playability characteristics of the ball.

12. A method according to claim 11, wherein the cover is irradiated using gamma radiation.

13. A method according to claim 11, wherein the cover is subjected to a radiation dosage of at least 2 megarads.

14. A method according to claim 11, wherein the golf ball cover is irradiated after application of a coating over the cover.

15. A method according to claim 11, further comprising the step of applying a top coating over the cover after irradiation.

* * * * *